United States Patent
Sekijima et al.

(10) Patent No.: US 6,957,429 B1
(45) Date of Patent: Oct. 18, 2005

(54) SERVICE PROCESSING APPARATUS AND SERVICE EXECUTION CONTROL METHOD

(75) Inventors: Akifumi Sekijima, Nakai-machi (JP); Kazuki Yasumatsu, Nakai-machi (JP); Hiroshi Hayata, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 708 days.

(21) Appl. No.: 09/617,436

(22) Filed: Jul. 14, 2000

(30) Foreign Application Priority Data

Sep. 3, 1999 (JP) ................................. 11-249553

(51) Int. Cl.[7] .......................... G06F 9/46; G06F 17/00
(52) U.S. Cl. .................... 718/100; 705/500; 706/11
(58) Field of Search ........................ 718/100, 102–104, 718/220, 201, 20, 223, 226; 706/11; 345/700, 345/762–763, 769, 771, 780, 810–11, 825; 709/200–201, 709/223–226; 705/500

(56) References Cited

U.S. PATENT DOCUMENTS

| | | | | |
|---|---|---|---|---|
| 5,892,948 A | * | 4/1999 | Aoki et al. ................. | 717/105 |
| 5,978,559 A | * | 11/1999 | Quinion ...................... | 358/1.15 |
| 6,182,052 B1 | * | 1/2001 | Fulton et al. ................ | 705/26 |
| 6,288,716 B1 | * | 9/2001 | Humpleman et al. ....... | 345/733 |
| 6,385,652 B1 | * | 5/2002 | Brown et al. ............... | 709/227 |
| 6,397,261 B1 | * | 5/2002 | Eldridge et al. ............ | 713/171 |
| 6,519,571 B1 | * | 2/2003 | Guheen et al. ............. | 705/14 |
| 6,546,419 B1 | * | 4/2003 | Humpleman et al. ....... | 709/223 |
| 2001/0037402 A1 | * | 11/2001 | Schneider ................... | 709/236 |
| 2002/0057298 A1 | * | 5/2002 | Wassom et al. ............ | 345/825 |
| 2003/0061322 A1 | * | 3/2003 | Igarashi et al. ............ | 709/223 |

FOREIGN PATENT DOCUMENTS

| | | |
|---|---|---|
| JP | A 9-218780 | 8/1997 |
| JP | A 10-254958 | 9/1998 |

* cited by examiner

*Primary Examiner*—Meng-Al T. An
*Assistant Examiner*—Syed J Ali
(74) *Attorney, Agent, or Firm*—Oliff & Berridge, PLC

(57) ABSTRACT

The present invention presents a list of applicable services dynamically updated and enables users to specify selective combinations of the services. A client includes an input unit, a display unit, a user authentication unit, a service display and selection unit, a document set display and display unit, and the like. The service display and selection unit creates a list of currently active, applicable services and performs processing for user's service selection. The document set display and selection unit creates a list of documents included in a document set specified by a user and performs processing for user's document selection. In the servers, a service management unit, a selected service execution unit, service providing units, a document information management unit, a document storage unit, and a user information management unit operate respectively.

21 Claims, 19 Drawing Sheets

FIG.2

| SERVICE IDENTIFIER |
| :---: |
| SERVICE NAME |
| SERVER NAME |
| CATEGORY NAME |
| SERVICE CONTENT DESCRIPTION |
| INPUT DATA INFORMATION |
| OUTPUT DATA INFORMATION |

FIG.3

| CATEGORY NAME | PRIORITY | PLURAL SELECTION |
| :---: | :---: | :---: |
| FILTER | 1 | POSSIBLE |
| EXTRACTION | 2 | IMPOSSIBLE |
| EDITING | 3 | IMPOSSIBLE |

FIG.4

| SERVICE IDENTIFIER | SERVICE NAME | SERVER NAME | CATEGORY NAME | SERVICE CONTENT DESCRIPTION | INPUT DATA INFORMATION | OUTPUT DATA INFORMATION |
|---|---|---|---|---|---|---|
| S001 | DAY FILTER | SERVER4 | FILTER | SELECT ALL MODIFIED FILES WITHIN THE LAST DAY. | HTML[ ] | HTML[ ] |
| S002 | CONCATENATE | SERVER6 | EDITING | CONCATENATE MULTIPLE HTML FILES INTO A SINGLE HTML FILE. | HTML[ ] | HTML |
| S003 | SUMMARIZE | SERVER5 | EXTRACTION | EXTRACTS FIRST 256 CHARACTERS FROM THE HTML FILE. | HTML[ ] | HTML[ ] |
| S004 | MONTH FILTER | SERVER4 | FILTER | SELECT ALL MODIFIED FILES WITHIN THE LAST MONTH. | HTML[ ] | HTML[ ] |
| S005 | WEEK FILTER | SERVER4 | FILTER | SELECT ALL MODIFIED FILES WITHIN THE LAST WEEK. | HTML[ ] | HTML[ ] |
| S006 | EXTRACT ANCHORS | SERVER5 | EXTRACTION | EXTRACTS ANCHORS FROM THE HTML FILE. | HTML[ ] | HTML[ ] |

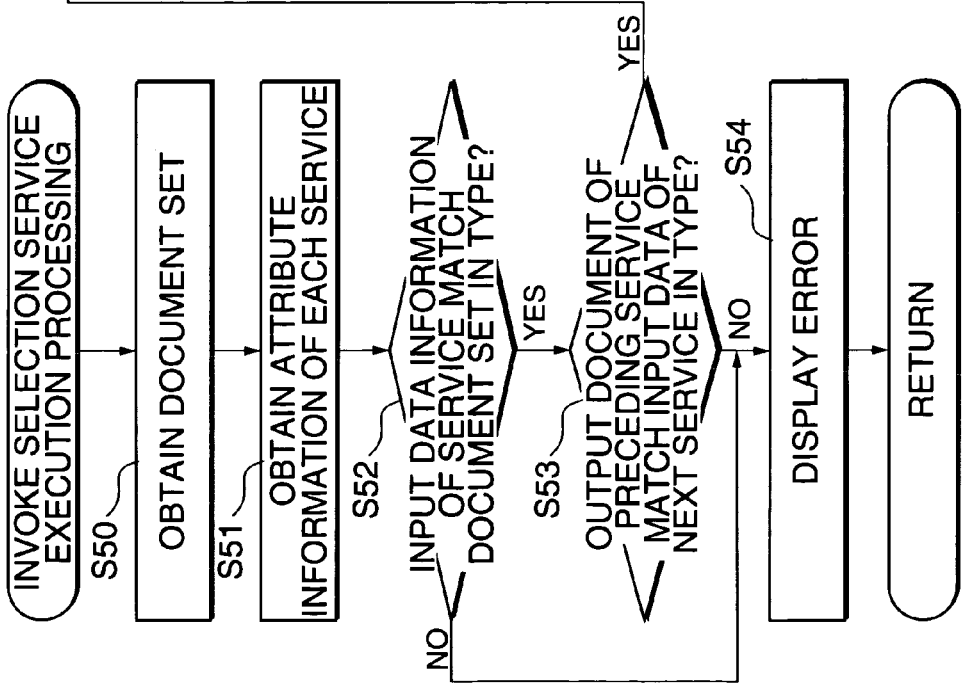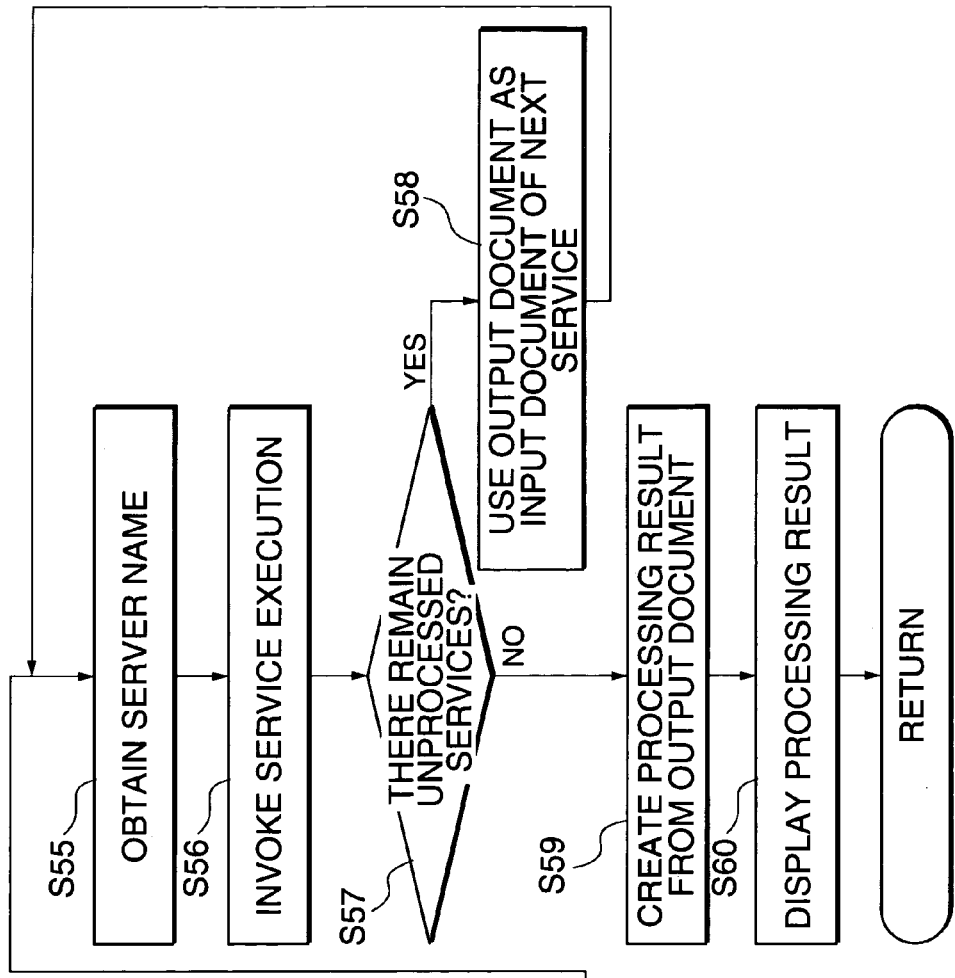
FIG.15

FIG.17

| | | |
|---|---|---|
| ☐ | DAY FILTER | 1/20 |
| ☐ | WEEK FILTER | 0/15 |
| ☐ | MONTH FILTER | 0/5 |
| ☐ | SUMMARIZE | 3/20 |
| ☐ | EXTRACT ANCHORS | 1/15 |
| ☐ | CONCATENATE | 1/40 |

FIG.18

| | | |
|---|---|---|
| ☐ | DAY FILTER | |
| ☐ | WEEK FILTER | |
| ☐ | KEYWORD FILTER | NEW |
| ☐ | SUMMARIZE | |
| ☐ | EXTRACT HEADERS | NEW |
| ☐ | CONCATENATE | |

FIG.19

- ☐ DAY FILTER
- ☐ WEEK FILTER
- ☐ KEYWORD FILTER   | KEYWORD INPUT |
- ☐ SUMMARIZE
- ☐ EXTRACT HEADERS
- ☐ CONCATENATE

FIG.20

- ☐ DAY FILTER
- ☐ WEEK FILTER
- ☐ KEYWORD FILTER
- ☐ SUMMARIZE
- ☐ EXTRACT HEADERS
- ☐ CONCATENATE

FIG.24

| CATEGORY NAME | PRIORITY | PLURAL SELECTION |
|---|---|---|
| COLLECTION | 1 | IMPOSSIBLE |
| FILTER | 2 | POSSIBLE |
| EXTRACTION | 3 | IMPOSSIBLE |
| EDITING | 4 | IMPOSSIBLE |

FIG.25

| SERVICE IDENTIFIER | SERVICE NAME | SERVER NAME | CATEGORY NAME | SERVICE CONTENT DESCRIPTION | INPUT DATA INFORMATION | OUTPUT DATA INFORMATION |
|---|---|---|---|---|---|---|
| S001 | DAY FILTER | SERVER4 | FILTER | SELECT ALL MODIFIED FILES WITHIN THE LAST DAY. | DATA[ ] | DATA[ ] |
| S002 | CONCATENATE | SERVER6 | EDITING | CONCATENATE MULTIPLE FILES INTO A SINGLE FILE. | DATA[ ] | DATA |
| S003 | SUMMARIZE | SERVER5 | EXTRACTION | EXTRACTS FIRST 1024 BYTES FROM THE FILE. | DATA[ ] | DATA[ ] |
| S004 | MOVIE COLLECTOR | SERVER3 | COLLECTION | GETS MOVIE DATA FROM THE SPECIFIED SERVER. | NULL | DATA[ ] |

SERVICE PROCESSING APPARATUS AND SERVICE EXECUTION CONTROL METHOD

BACKGROUND OF THE INVENTION

1. Field of the Invention

The present invention relates to a service processing apparatus which applies selective combinations of services applicable at some point to specified data in an environment in which plural services are dynamically started or halted on plural networked computers.

2. Description of the Prior Art

With recent advances in computer networks as typified by the Internet, various services have been provided on networked servers. These services include services of numerous types, such as a retrieval service to retrieve databases based on given keywords, online shopping and ticket reservation services, and a service to translate and print given documents.

Recently, a proposal has been made to bring about new effects by not only providing a single service but also combining plural services. This enables the coupling of processing performed by services by defining an interface for exchanging data among the services. By in advance providing several services to perform basic processing and combining them, services to perform more complex processing are flexibly created.

For example, a first prior art described in Japanese Published Unexamined Patent Application No. Hei 9-218780 provides a function to design a series of document processing flows by combining services such as document printing by a printer, document input by a scanner, and document distribution by electronic mail. In an example described in the patent application, services are classified into functional categories such as document input, output, and storage, and services usable in each functional category are managed in centralized form by a database on a specific application server. Users place icons corresponding to required functional categories on a graphical user interface and connect them by links, and thereby design a processing flow. By selecting desired services from each functional category, a series of document processing such as reading documents from a specific scanner and outputting them to a specific printer can be performed.

A second prior art described in Japanese Published Unexamined Patent Application No. Hei 10-254958 provides a function to execute a combination of services provided by plural servers, based on a predetermined scenario. In an example described in the patent application, each server has a database for managing the specifications of services provided by it. Clients, based on a predetermined scenario containing a processing flow, retrieve services satisfying functional requirements constituting the processing flow from the database and invoke the obtained services in an order specified in the scenario. Thereby, for example, a series of processing such as reserving a train ticket and reserving a hotel based on the result can be performed.

In such a system that executes combinations of plural services distributed over networks, since the services operate independently of each other, not all services are always usable. Therefore, the system must manage information about a list of services usable at a given point. The information about a list of usable services must be updated according to the activation or halt of services or change of service contents.

In the first prior art, an application server managing services in centralized form periodically queries registered servers or devices such as printers and updates a database managing the services if the state of the services changes. Moreover, if a service has been newly added, the event information is passed to the application server and the database managing the services is dynamically updated.

In the second prior art, the servers to provide services update the database for managing the service specifications according to the addition or deletion of services or change of the specifications. Moreover, in another embodiment of the second prior art, the clients manage the specifications of services in advance obtained from the servers. In this case, the servers have means to report changes of service states and the clients have means to receive the change information, and thereby update the database for managing the service specifications according to changes of service states.

Any of the above prior arts assumes routine processing such as repetitive use of preregistered combinations of services relating to specific fields. Therefore, types of services provided and combinations of the services are limited to a range predefined by a system administrator, and non-routine processing such as execution of any combination of services selected as required by users is not supported.

In the second prior art as described previously, for example, combinations of services are defined by scenarios in advance provided by a system administrator and a function for the users themselves to select necessary services and combine them is not provided.

In the first prior art, the users themselves can select and combine services only within a range based on preregistered functional categories. Accordingly, with limited freedom, the users cannot individually add new services not belonging to existing functional categories and combine them at their disposal.

However, in services over networks, there is a stronger demand for non-routine processing such as execution of free combinations of services required at a given point than for routine processing in which predetermined combinations of services are set. This is because the formats of data used in services and service contents are revised every year and new services are devised and provided one after another. For this reason, service users are required to selectively combine services applicable at the particular point to achieve their purposes.

SUMMARY OF THE INVENTION

The present invention presents users with a list of applicable services dynamically updated and enables the users to specify selective combinations of the services. Thereby, the present invention provides service users with the easy recognition of applicable services, flexible selection of services to meet users' purposes, and smooth application of selected services to relevant data.

According to an aspect of the present invention, the service processing apparatus has: plural service providing sections for providing services to perform predetermined information processing; a service display and selection section for presenting users with a list of applicable services and receives the selection and specification of services from users; and a selected service execution section for applying user-selected services to specified data or a set thereof, wherein the service display and selection section updates a list of applicable services as required and enables the users to specify selective combinations of the services, and the selected service execution section directs the service providing section to execute services, based on a specified combination of services.

In this configuration, since the service display and selection section presents users with a list of applicable services updated as required and enables the users to specify selective combinations of the services, the users can easily recognize currently active, applicable services, and select and combine the services flexibly to meet their purposes.

In this configuration, the service processing apparatus may have a service management section for managing information about a set of active services and services provided by each service providing section, wherein the service display and selection section may present users with a list of applicable services obtained by querying the service management section.

The service providing section each may operate on plural networked servers and the service management section may hold, as service information, information about servers that are executing services.

The service processing apparatus may have a document management section for managing documents and document sets, and a document set display and selection section for presenting users with a list of predetermined document sets managed by the document management section or documents included in the document sets and receiving the selection and specification of document sets or documents from the users, to enable the users to specify selective combinations of document sets or documents to, be subjected to services.

In this configuration, since the document set display and selection section presents users with a list of documents included in a document set to enable the users to specify selective combinations of document sets or documents to be subjected to services, the services can apply smoothly to the documents.

Information about services provided by the service providing section may include summaries of the processing contents of the services, and the service display and selection section displays summaries of service processing contents in association with service items when displaying a list of applicable services.

Information about services provided by the service providing section may include information about the total number of transactions having been heretofore processed by the services and the number of transactions currently being processed, and the service display and selection section, when displaying a list of applicable services, displays information about the total number of transactions having been processed and the number of transactions currently being processed, in association with service items, or changes the display form of the service items according to the total number of transactions having been processed and the number of transactions currently being processed.

Information about services provided by the service providing section may include information about the load status of servers to execute the services, and the service display and selection section, when displaying a list of applicable services, displays the server load status in association with service items, or changes the display form of the service items according to the server load status.

Information about services provided by the service providing section may include service activation time or elapsed time from the activation of the services, and the service display and selection section, when displaying a list of applicable services, displays the activation time or elapsed time in association with service items, or changes the display form of the service items according to the activation time or elapsed time.

By setting predetermined categories into which services are classified according to the content of the services, information about services provided by the service providing section may include information about the categories of the services, and the service display and selection section, when displaying a list of applicable services, displays information about the categories in association with service items, changes the display form of the service items according to the categories, or places service items grouped for each category.

Information about the categories of services may include information indicating whether two or more services belonging to the categories can be selected at the same time, and the service display and selection section, when receiving the selection and specification of services from users, allows the users to exclusively select services belonging to categories that do not allow simultaneous selection of plural services.

Information about services provided by the service providing section may include information about data inputted as a processing object of the services and data outputted as a processing result, and the service display and selection section, when displaying a list of applicable services, places service items according to input data information and output data information or displays the input data information and the output data information in association with the service items.

When the service display and selection section receives the selection and specification of services from users, or when the selected service execution section receives a combination of services selected in the service display and selection section, in such a service combination that an output result of a specified service is used as a processing object of another service, it is judged whether the output data information of the former services matches the input data information of the latter, and the services may be executed only if they match.

Information about services provided by the service providing section may include information about input parameters of the services, and the service display and selection section, when displaying a list of applicable services, if the services require input parameters, places fields for inputting the parameters in association with service items.

Information about services provided by the service providing section may include information about service priority, and the service display and selection section, when displaying a list of applicable services, displays the priority information in association with service items, changes the display form of service items according to priority, and places the service items, based on the priority.

The service processing apparatus may include a user management section for managing information about users and user groups, wherein information about services provided by the service providing section may include information about users or user groups which can use the services, whereby the service display and selection section, when displaying a list of applicable services, displays only service items usable to a specified user or a group to which the user belongs, or discriminately displays usable service items and other ones.

As a method for displaying a list of services, the service display and selection section may present a set of icons representing applicable services, and users select and place desired icons from the icon set, whereby the selected service execution section decide a service execution order according to the positions in which the icons representing the services are placed.

When displaying a list of services, the service display and selection section may change the display form of icons representing the services according to information about services provided by the service providing section, and may display graphic elements decided based on the information about services in association with icons representing corresponding services.

The present invention may be implemented as a method and at least part thereof may be implemented as a computer program product.

BRIEF DESCRIPTION OF THE DRAWINGS

Preferred embodiments of the present invention will be described in detail based on the followings, wherein:

FIG. 2 illustrates the structure of service attribute information used in the first embodiment;

FIG. 3 illustrates service category information used in the first embodiment;

FIG. 4 shows an example of a service management table used in the first embodiment;

FIG. 15 is a flowchart for explaining the operation of a selected service execution unit of the first embodiment;

FIG. 17 shows an example of a service list of the second embodiment;

FIG. 18 shows another example of a service list of the second embodiment;

FIG. 19 shows another example of a service list of the second embodiment;

FIG. 20 shows another example of a service list of the second embodiment;

FIG. 24 shows an example of category information of services managed by the service management unit of the fourth embodiment; and FIG. 25 shows an example of a service management table managed by the service management unit of the fourth embodiment.

DESCRIPTION OF THE PREFERRED EMBODIMENTS

Embodiments of the present invention will be described hereinafter.

First Embodiment

As a first embodiment of the present invention, there is shown a service processing apparatus that presents users with a list of applicable services and applies a combination of user-selected services to a set of required documents in an environment in which plural services are dynamically started or halted on networked plural servers.

Figure 1:
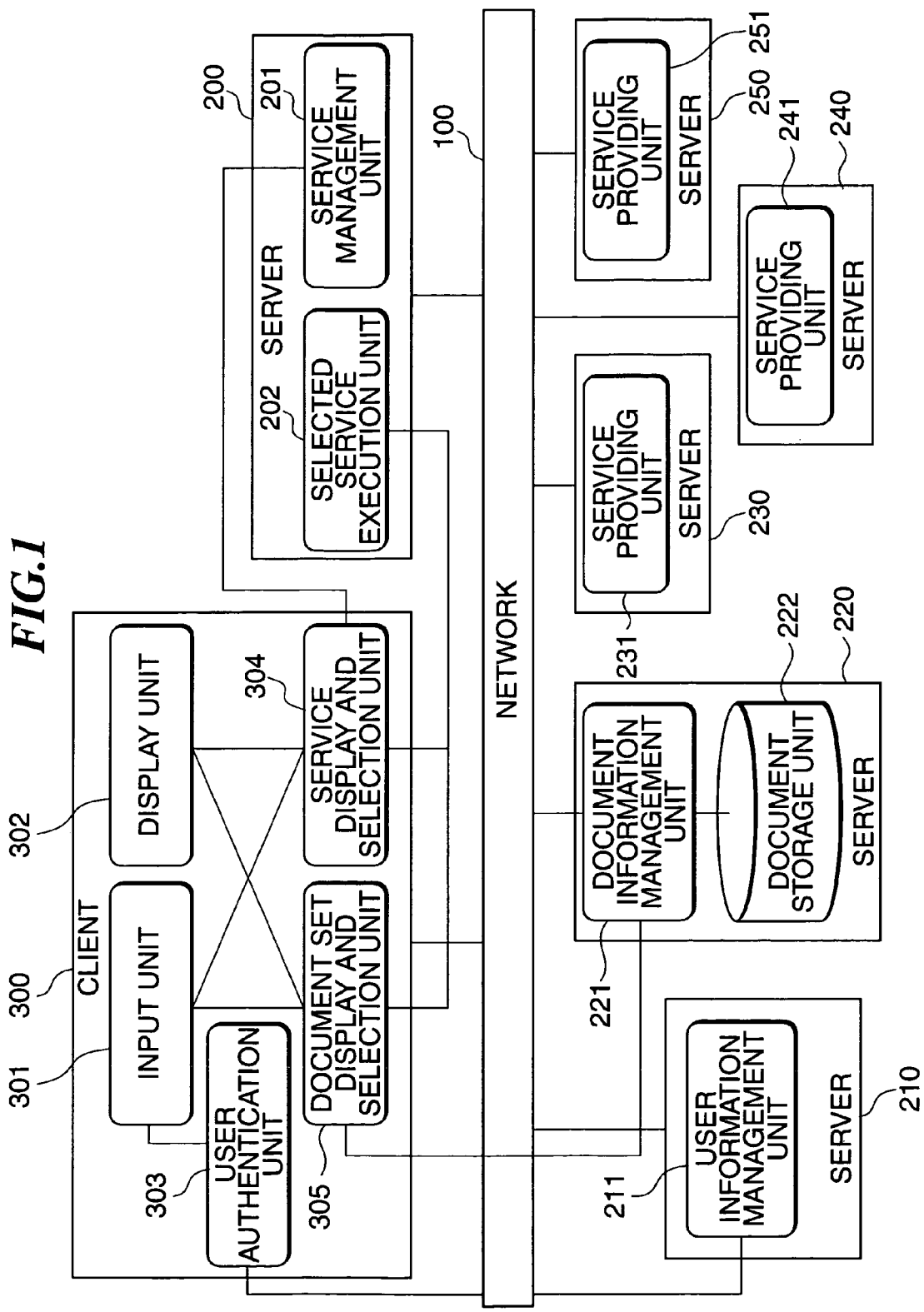
FIG. 1 is a block diagram showing the configuration of a service processing apparatus of a first embodiment of the present invention.

FIG. 1 shows the configuration of a service processing apparatus of the first embodiment. As shown in the drawing, the service processing apparatus includes plural servers 200, 210, 220, 230, 240, and 250, and a client 300 connected over a network 100.

The client 300 includes an input unit 301, a display unit 302, a user authentication unit 303, a service display and selection unit 304, a document set display and selection unit 305, and the like. The input unit 301 is an input apparatus such as a keyboard and mouse. The display unit 302 is a display device. The user authentication unit 303, when the client 300 starts processing, authenticates a user and holds information about the user. The service display and selection unit 304 creates a list of currently active, applicable services and performs processing for a user's service selection. The document set display and selection unit 305 creates a list of documents included in a document set specified by a user and performs processing for a user's document selection.

On the other hand, in the servers 200, 210, 220, 230, 240, and 250, a service management unit 201, a selected service execution unit 202, service providing units 231, 241, and 251, a document information management unit 221, a document storage unit 222, and a user information management unit 211 operate respectively. The service processing apparatus of the present embodiment is configured so that the service management unit 201 and the selected service execution unit 202 operate in the server 200 of FIG. 1; the user information management unit 211 in the server 210; the document information management unit 221 in the server 220; and the service providing units 231, 241, and 251 in the servers 230, 240, and 250, respectively. However, these may operate in one server or other combinations are also possible. The service management unit 201 and the selected service execution unit 202 may operate on not a specific server but a client.

The service management unit 201 manages a service management table (FIG. 4) to store attribute information of active services and updates a service management table in response to the activation and halt of service. It also holds information of categories (FIG. 3) into which services are classified according to the contents of the services. The selected service execution unit 202 applies a combination of services selected by users to a set of documents selected by the users. The user information management unit 211 manages attribute information of users and groups to which the users belong. The document information management unit 221 manages attribute information of documents or document sets and fetches document data in response to requests. The document storage unit 222 is an apparatus such as a hard disk drive to store the content data of documents. The service providing units 231, 241, and 251 perform required document processing on a set of given documents.

FIG. 2 shows the structure of service attribute information managed by the service management unit 201. A service identifier is used to uniquely identify a service. A service name is the name of the service, afforded by a service provider. A server name is the name of a server that is executing the service. A category name is the name of a category into which the service is classified by the service content. A service content description is a description of the service content. Input data information is the type name of a document inputted as a processing object of the service. Output information is the type name of a document outputted as the result of processing the service. The service name, category name, service content description, input data information, and output data information are passed to the service management unit from the service providing unit when the service is activated.

FIG. 3 shows an example of category information of services managed by the service management unit 201. "Priority" in the drawing indicates a priority of service execution. In this example, services are executed in the order of the categories of "filter", "extraction", and "editing". "Plural selection" in the drawing indicates whether two or more of services belonging to the same category can be selected. In this example, although two or more of services of a filter category can be selected, only one of services of other categories can be selected at a time for each category.

FIG. 4 shows an example of a service management table managed by the service management unit 201. The value of "html" in the input data information or output data information field in the drawing indicates that an HTML document is used as the type of a document inputted to the service or the type of a document outputted by the service. The value of "html[ ]" indicates that an array of HTML documents is used as the type of input or output documents. Therefore, a "Concatenate" service in the drawing indicates that an array of HTML documents is received as input documents and an HTML document is sent back as an output document.

Figure 5:
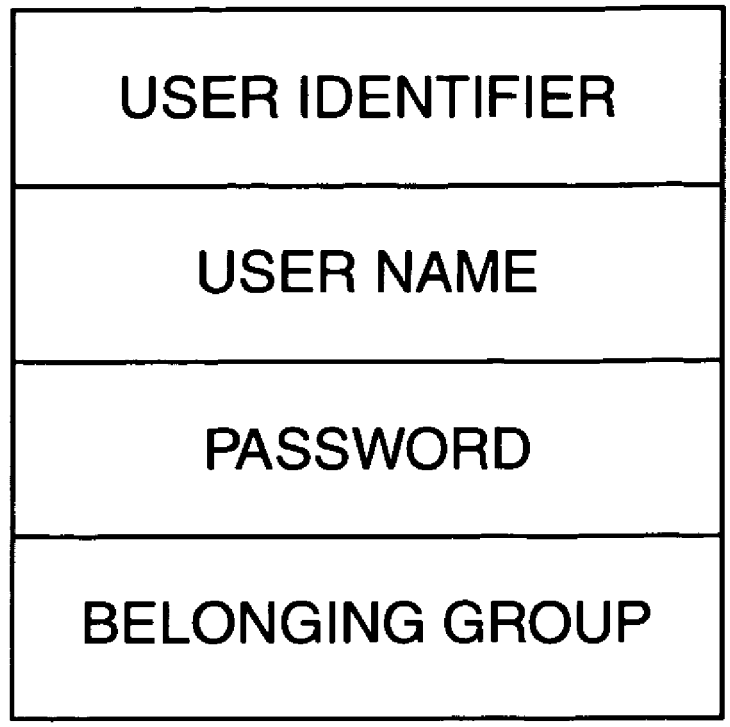
FIG. 5 illustrates the structure of user attribute information used in the first embodiment.

FIG. 5 shows the structure of attribute information of users managed by the user information management unit 211. A user identifier is an identifier for uniquely identifying a user. A user name is a name assigned to the user. A password is a character string used to authenticate the user. A belonging group is the identifier of a group to which the user belongs.

Figure 6:
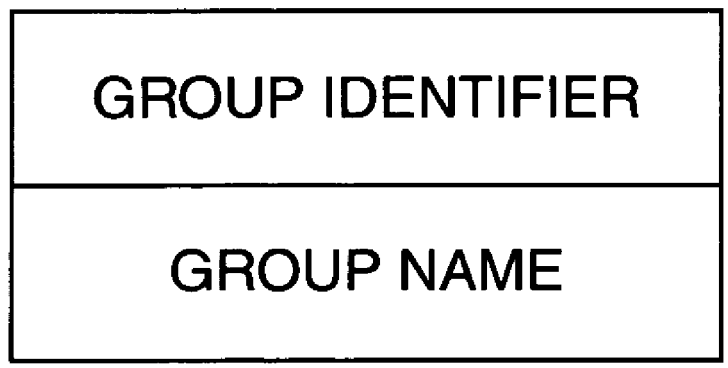
FIG. 6 illustrates the structure of group attribute information used in the first embodiment.

FIG. 6 shows the structure of attribute information of groups to which users managed by the user information management unit 211 belong. A group identifier is an identifier for uniquely identifying a group. A group name is a name assigned to the group.

Figure 7:
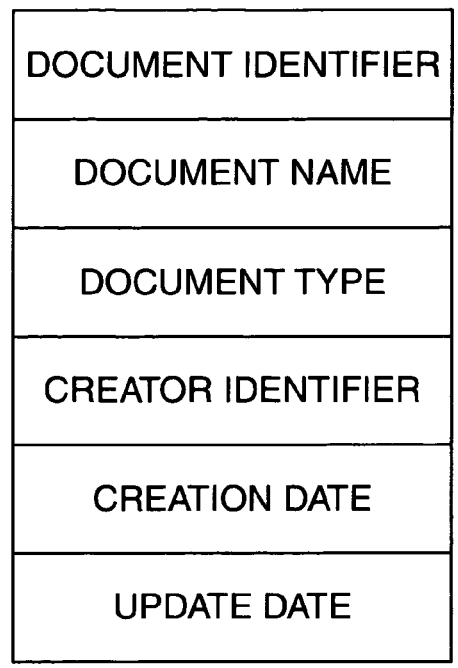
FIG. 7 illustrates the structure of document attribute information used in the first embodiment.

FIG. 7 shows the structure of attribute information of documents managed by the document information management unit 221. A document identifier is an identifier for uniquely identifying a document. A document name is a name assigned to a creator of the document. A document type is the type name of the document. A creator identifier is the identifier of the user who created the document. A creation date is a date when the document was created. An update date is a date when the document content was updated. This example assumes that the document storage unit holds the content data of the document in association with the document identifier.

Figure 8:
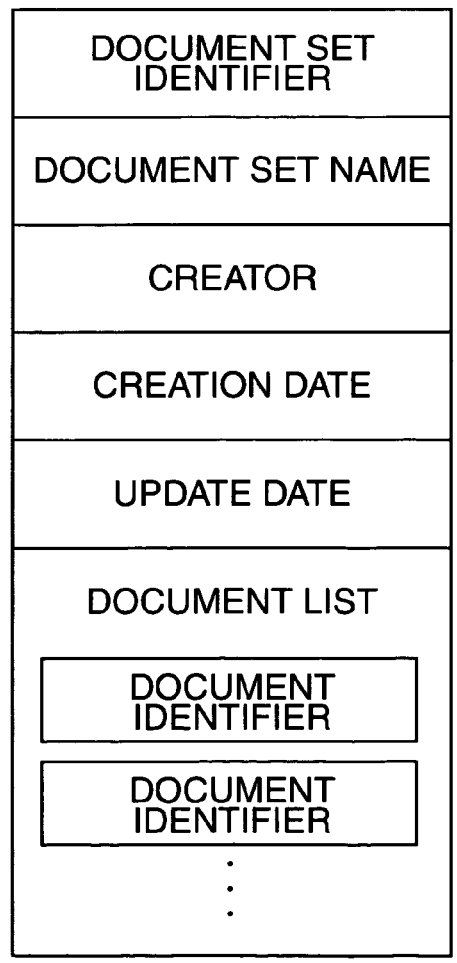
FIG. 8 illustrates the structure of document set attribute information used in the first embodiment.

FIG. 8 shows the structure of attribute information of document sets managed by the document information management unit 221. A document set identifier is an identifier for uniquely identifying a document set. A document set name is a name given by the creator of the document set. A creator identifier is the identifier of the creator of the document set. A creation date is a date when the document set was created. An update date is a date when the content of the document set was updated. A document list is a list of the identifiers of documents included in the document set.

Figure 9:
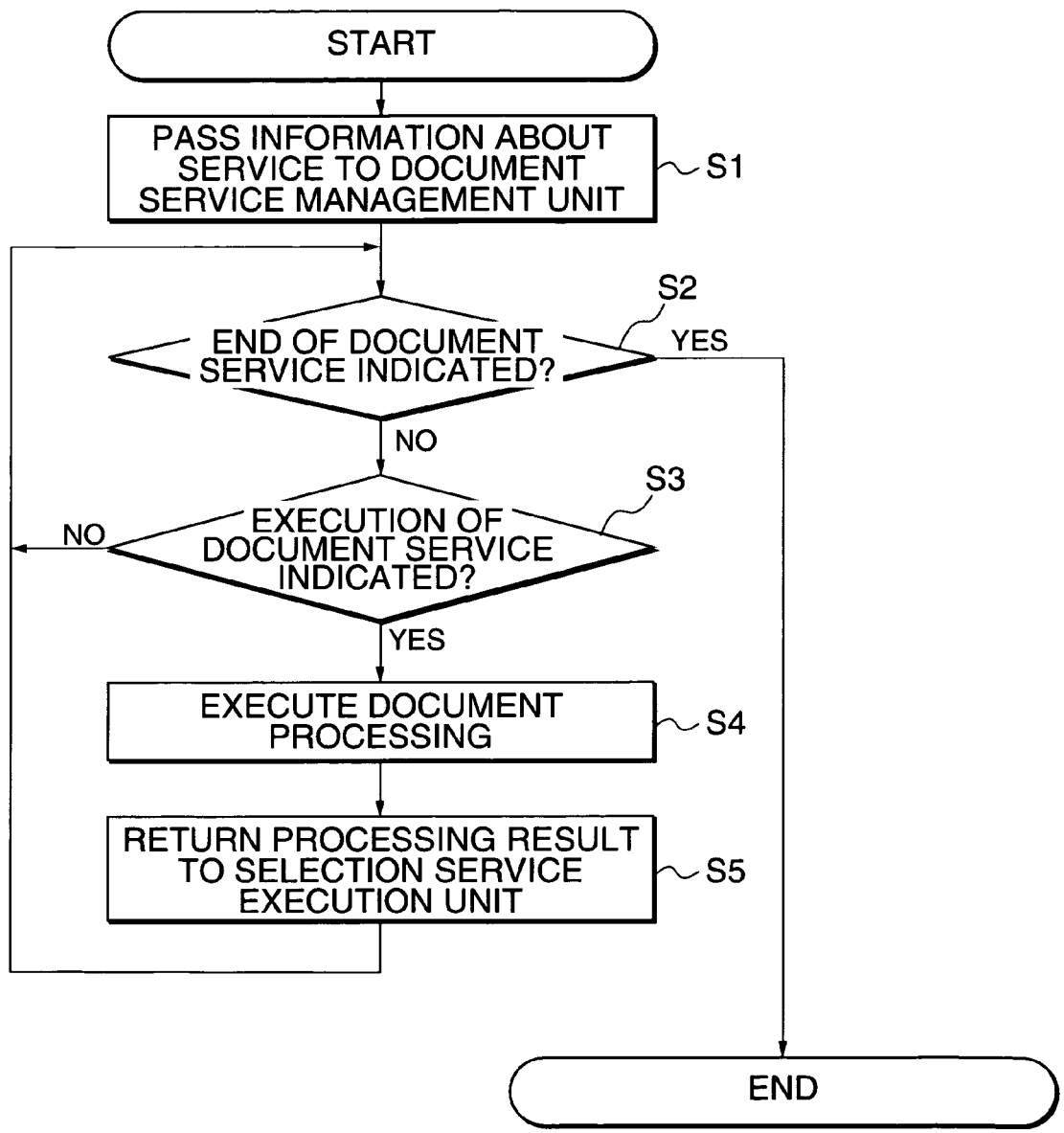
FIG. 9 is a flowchart for explaining the operation of a service providing unit of the first embodiment.

Next, processing in the service providing units 231, 241, and 251 is described with reference to the flowchart of FIG. 9.

[Step S1]: When a service is activated by a service provider, pass information about the service to the service management unit.

[Step S2]: The service enters an indication-waiting state. If termination of the service is indicated by the service provider, terminate processing. Otherwise, go to the next step.

[Step S3]: Judge whether execution of the service is indicated by the selected service execution unit, and if so, go to the next step.

[Step S4]: Perform required document processing based on a given input document to create an output document.

[Step S5]: Pass the obtained output document to the selected service execution part and enter an indication waiting state.

This terminates the description of processing in the service providing units 231, 241, and 251.

Figure 10:
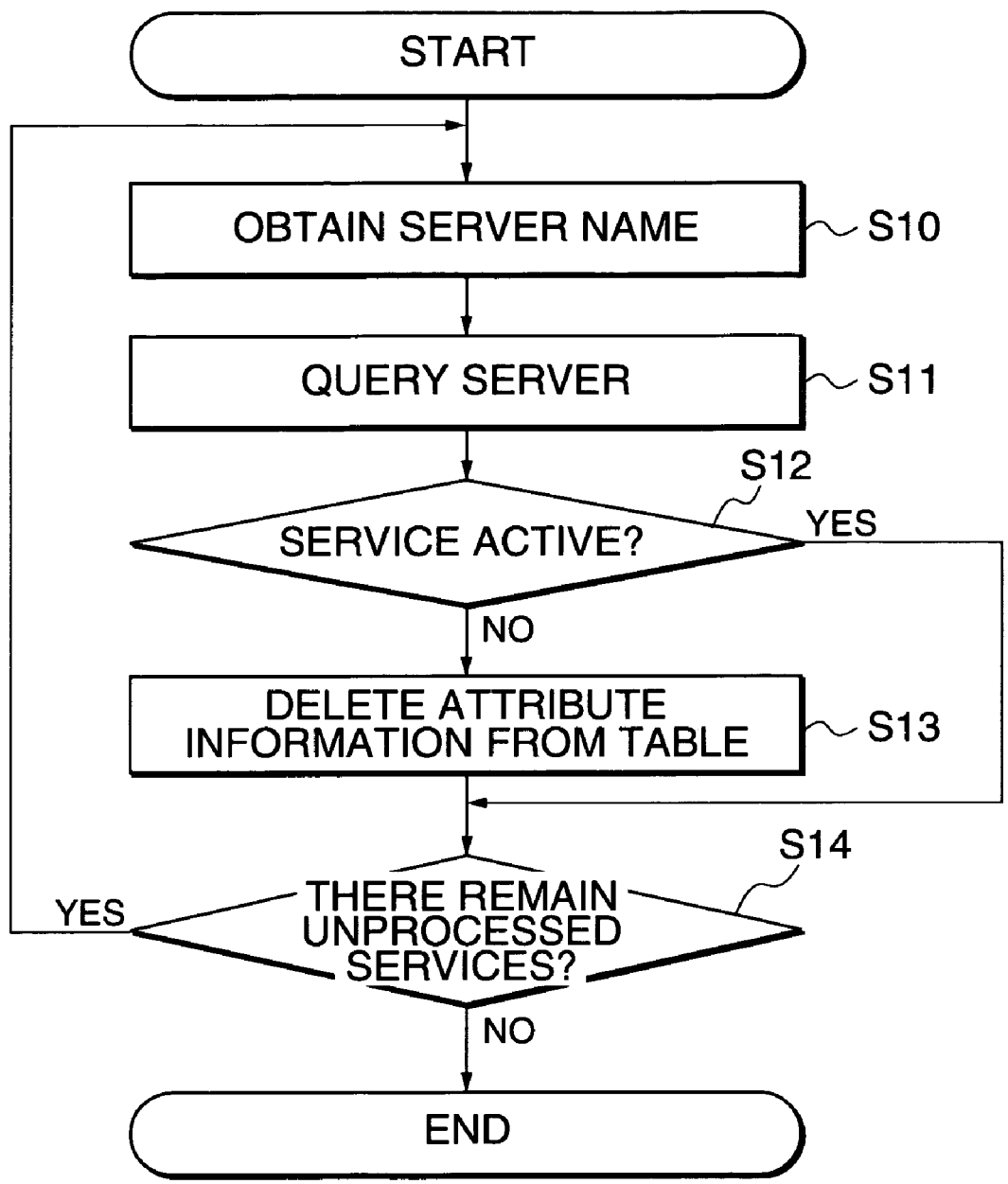
FIG. 10 is a flowchart for explaining the operation of a service management unit of the first embodiment.

Upon receiving information about the service from the service providing units 231, 241, and 251, the service management unit 201 creates attribute information of the service and adds it to the service management table. It periodically updates the service management table. Hereinafter, service management table update processing in the service management unit 201 is described with reference to the flowchart of FIG. 10.

[Step S10]: Fetch one piece of attribute information from the service management table and obtain a server name.

[Step S11]: Query the service providing unit on the server about whether the service is active.

[Step S12]: If the service halts, go to the next step, and otherwise go to step S14.

[Step S13]: Delete attribute information corresponding to the halted service from the service management table.

[Step S14]: Judge whether there remain unprocessed services, and if so, go to step S10. Otherwise, terminate the service management table update processing.

Although there has been shown herein an example that the service management unit 201 periodically queries servers that execute services, and updates the service management table based on the result, the service management table 201 may receive event information such as service start and halt from the service providing units 231, 241, and 251 to update the service management table each time the event information occurs.

Figure 11:
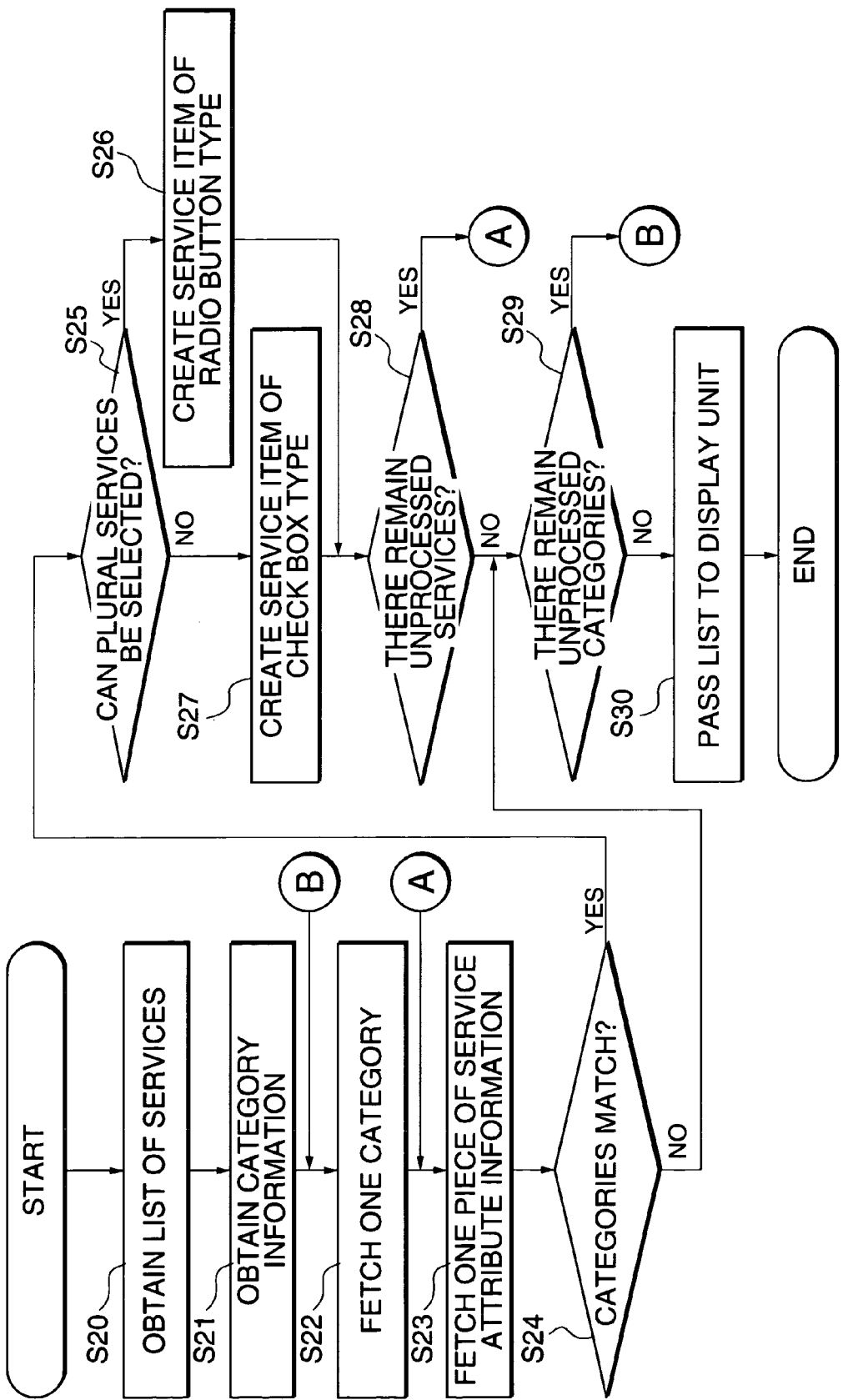
FIG. 11 is a flowchart for explaining the display operation of a service display and selection unit of the first embodiment.

Next, service list creation processing in the service display and selection unit 304 of the client 300 is described based on the flowchart of FIG. 11.

[Step S20]: Obtain a set of pieces of service attribute information stored in the service management table from the service management unit 201.

[Step S21]: Obtain category information of services from the service management unit.

[Step S22]: Enter a loop for sorting services for each category and fetch one piece of the category information according to the priority of categories.

[Step S23]: Enter a loop for extracting a service belonging to the category fetched in step S22 and obtain one piece of service attribute information.

[Step S24]: Judge whether a category name contained in the attribute information matches the name of the category fetched in step S22, and if so, go to the next step. Otherwise, go to step S29.

[Step S25]: Judge whether two or more of the belonging service can be selected for the category fetched in step S22, and if so, go to step S26. Otherwise, go to step S27.

[Step S26]: Fetch a service identifier, a service name, and a service content description from the attribute information, create a service item of "radio button" type representing a service and add it to a service list, and go to step S28.

[Step S27]: Fetch a service identifier, service name, and service content description from the attribute information, create a service item of "check box" type representing a service and add it to a service list, and go to step S28.

[Step S28]: Judge whether there remain unprocessed services, and if so, go to step S23. Otherwise, go to step S29.

[Step S29]: Judge whether there remain unprocessed services, and if so, go to step S22. Otherwise, go to step S30.

[Step S30]: Pass the created list of services to the display unit and terminate the service list creation processing.

Figure 12:
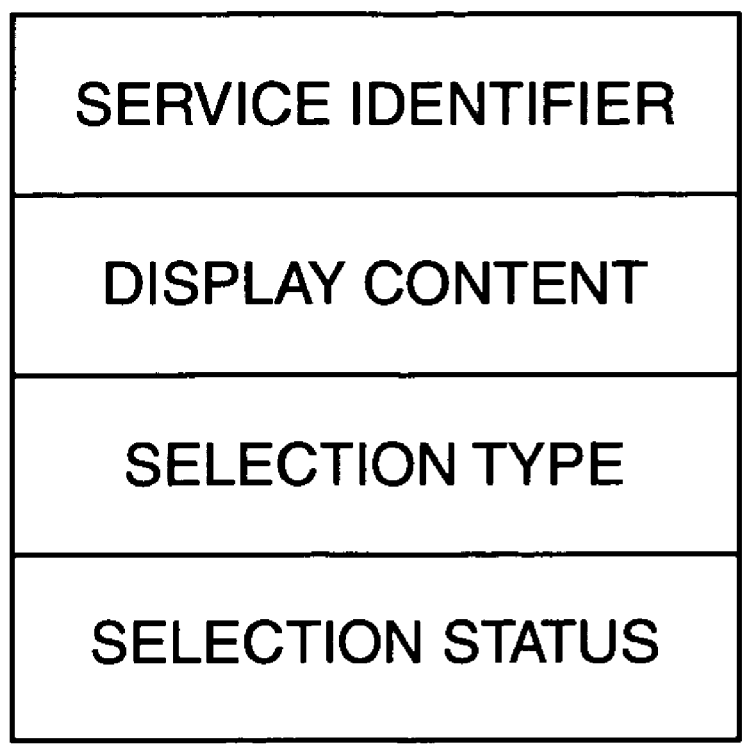
FIG. 12 illustrates service items related to a service used as a processing object of the service display and selection unit of the first embodiment.

The service items created in the steps S26 and S27, as shown in FIG. 12, form a data structure having a service identifier, display content, selection type, and selection status. The display content is information displayed on the screen as the service item. In this example, a service name and service content description are displayed. The selection type is information indicating whether two or more services belonging to the same category can be selected at the same time; it takes the value of "check box" if two or more can be selected, and otherwise the value of "radio button." The selection status is information indicating whether the service item has been selected, and takes the value of "selection" or "non-selection." When the service item is created, the selection status is set to "non-selection."

The service list creation processing is performed periodically or at a user-specified point, and updates a list of applicable services every time. As an alternative method, the service display and selection unit 304 may receive, from the service management unit 201, event information indicating that the service management table was updated, to update the list of services each time the event information occurs.

On the other hand, when a user selects a required document set to be processed by the service, the document set display and selection unit 305 creates a list of documents included in the document set. A list of documents in a document set can be created by the same well-known method as used in the creation of a list of files contained in a specified directory by an existing file browser. Herein, a detailed description is omitted.

Figure 13:
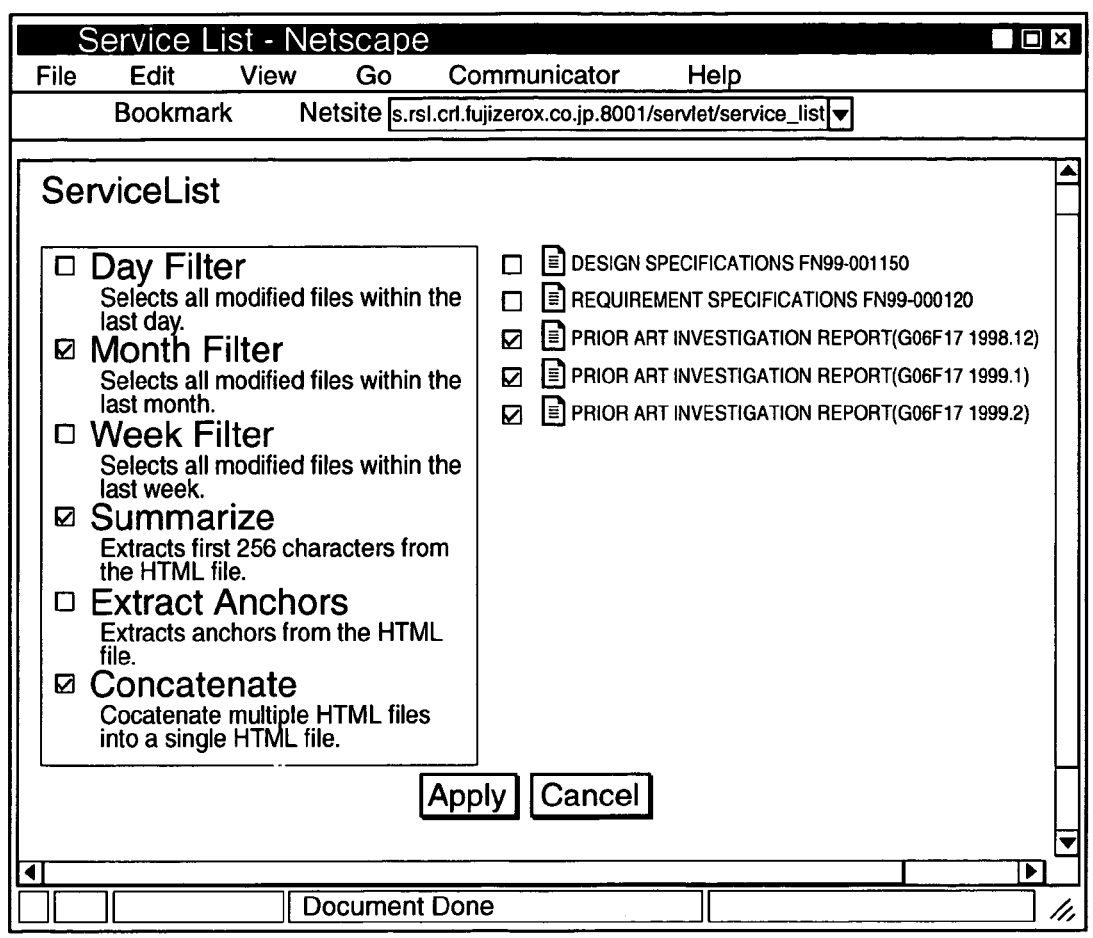
FIG. 13 shows an example of display by the service display and selection unit of the first embodiment.

FIG. 13 shows an example of a list of applicable services and a list of documents in a document set to be processed, which are created by the above processing.

Next, service selection processing in the service display and selection unit 304 is described with reference to the flowchart of FIG. 14. The service selection processing is started after the service list creation processing is performed at least once.

[Step S40]: Enter a loop to wait for an indication from the user. For an indication from the user, judge an indicated content, and if the selection of a service item is indicated, go to the next step. Otherwise, go to step S44.

[Step S41]: Judge whether the selected service item is of "radio button" type, and if so, go to the next step. If the type of the selected service item is "check box", go to step S43.

[Step S42]: Set the selection status of other service items belonging to the same category as that of the selected service item to "non-selection", and go to the next step.

[Step S43]: Set the selection status of the selected service item to "selection" and return to the indication-waiting loop.

[Step S44]: Judge whether the content indicated by the user is execution of the selected service, and if so, go to the next step. Otherwise, go to step S47.

[Step S45]: Extract service items with the selection status of "selection" from service items to create a set of service identifiers.

[Step S46]: Pass the set of service identifiers to the selected service execution unit and invoke selected service execution processing.

[Step S47]: Judge whether the content indicated by the user is termination of processing, and if so, terminate the service selection processing. Otherwise, return to the indication-waiting loop.

The document set display and selection unit 305, after creating a list of documents in a document set at least once, performs document selection processing to select specific documents to be processed by a service from the list of documents in the document set. The document selection processing can be performed in the same way as the service selection processing or by the same well-known method as in selection of files contained in a specified directory by an existing file browser. Herein, a detailed description is omitted.

Next, selected service execution processing in the selected service execution unit 202 is described with reference to the flowchart of FIG. 15.

[Step S50]: Receive a set of document identifiers corresponding to selected documents from the document display and selection unit 305, and obtain a set of input documents from the document information management unit, based on the document identifiers.

[Step S51]: For the set of service identifiers received from the service display and selection unit 304, obtain attribute information of each service from the service management unit.

[Step S52]: Judge whether the type of each input document obtained in step S50 matches the type of input data information of the first service, and if they match, go to the next step. Otherwise, go to step S54.

[Step S53]: Sequentially from the start of the set of services, judge, for two successive services, whether the type of an output document of a preceding service matches the type of an input document of the next service, and if this is satisfied for all services, go to step S55. Otherwise, go to step S54.

[Step S54]: Display an error and return to the invocation source.

[Step S55]: According to the order of the services in the set, obtain a server name from the service attribute information obtained in step S51.

[Step S56]: Access the server, pass an input document to the service providing units 231, 241, and 251, and invoke service execution.

[Step S57]: Judge whether there remain unprocessed services, and if so, go to step S58, and otherwise go to step S59.

[Step S58]: Use an output document of the service invoked in step S56 as an input document of the next service and go to step S55.

[Step S59]: Create the display content of a processing result, based on the output document of the service invoked in step 56.

[Step S60]: Pass the processing result to the display unit 302 and return to processing of the invocation source.

By performing the above processing, a combination of services selected by the user from a list of applicable services are applied to a user-specified document set, and its result can be presented to the user.

Although, in the present embodiment, the service management unit 201 manages attribute information of active services in centralized form, the system may be configured so that a list of usable services is obtained without using the service management unit 201. The following is an example of a practicable configuration. The service display and selection unit 304 manages a set of servers in which services are active, and the service providing units 231, 241, and 251 manage service attribute information, whereby, to create a list of usable services, the service display and selection unit 304 queries the service providing units to obtain the service attribute information.

Second Embodiment

Next, a second embodiment of the present invention is described. The second embodiment is a service processing apparatus that presents users with a list of applicable services while associating information about the services with service items.

The configuration of the second embodiment of the present invention is the same as that of the first embodiment. However, items as shown in FIG. 16 are added to service attribute information managed by the service management unit 201.

Figure 16:
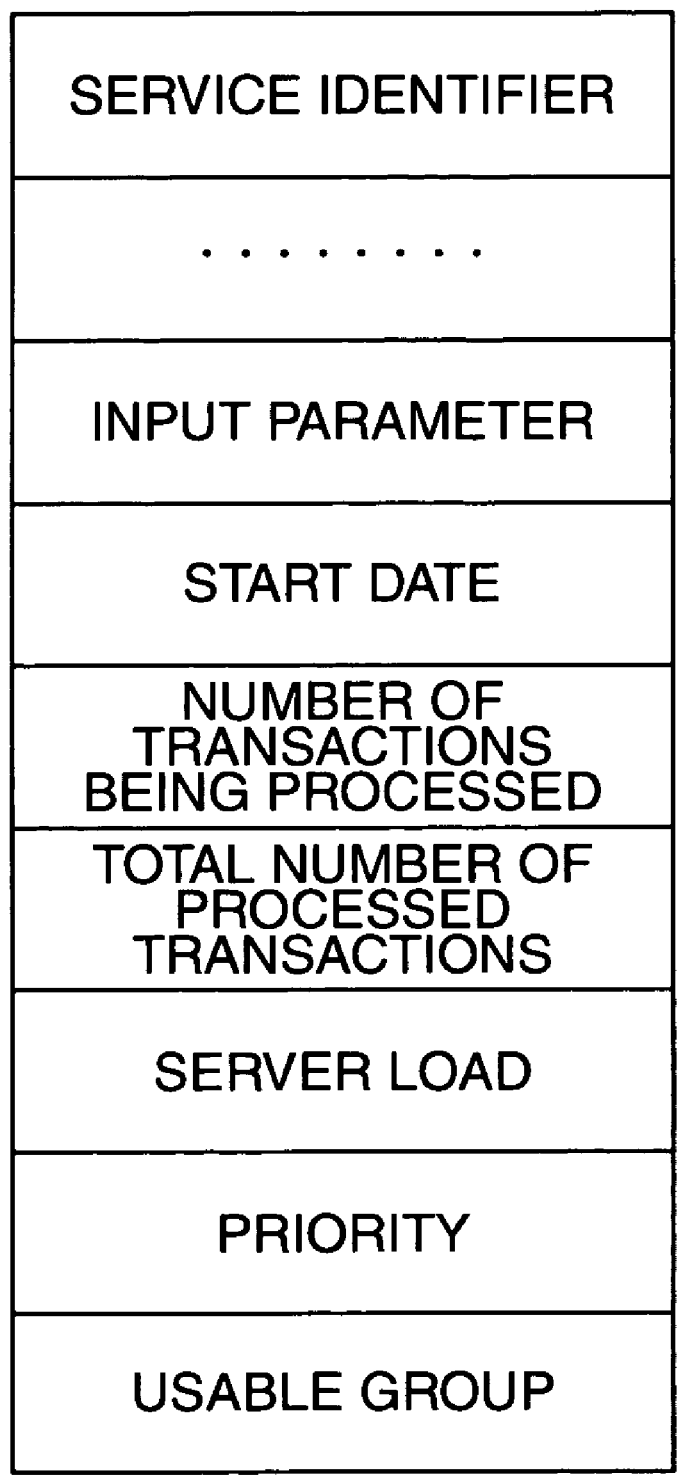
FIG. 16 illustrates service attribute information used in a second embodiment of the present invention.

In FIG. 16, "input parameter" denotes input information afforded to a service aside from an input document; for services requiring input information, the data type of input information is set, and for other services, a null value is set. "Activation date" holds a date when the service was activated. "Number of transactions being processed" holds the number of transactions currently being processed by the service and "total number of processed transactions" holds the total number of transactions having been heretofore processed by the service. "Server load" holds information about a load status calculated from a CPU use ratio and other factors of a server that executes the service. "Priority" holds information about the priority of the service in an execution order. "Usable group" holds a set of user groups that can use the service.

These pieces of information are offered from the service providing units, and the service management unit 201 updates the service attribute information during periodical service management table updating. The service display and selection unit 304, when performing service list creation processing, creates service items, based on these pieces of information.

FIG. 17 shows an example of displaying a list of applicable services in association with information about the services. In this example, as part of each service item, the number of transactions currently being processed by the service and the total number of transactions having been heretofore processed are included. For example, the notation "1/20" in the drawing indicates that the number of transactions currently being processed is one and the total number of transactions having been heretofore processed is 20.

This can be implemented by creating a display content using "number of transactions being processed" and "total number of processed transactions" contained in the service attribute information when creating a service item in step S26 or S27 of the service list creation processing shown in FIG. 11. In the same way, document items produced using the values of "server load", "priority", and the like can also be included in a service list.

In this way, by including the number of transactions being processed by services, a server load status, and the like in a list of usable services, users can easily recognize the current state of services and thereby can appropriately select services by referencing these pieces of information.

FIG. 18 shows an example that, using an activation date contained in the service attribute information when creating service items during the service list creation processing, changes the display form of items representing services having a value equal to or smaller than a given value as the difference between the activation date and a current date. According to this example, items representing services within a given elapsed time from an activation date are marked with a symbol "New". Thereby, users can easily recognize services newly activated.

FIG. 19 shows an example that, when a predetermined data type is specified in "input parameter" contained in the service attribute information when creating service items during the service list creation processing, displays a field for inputting parameters in association with a service item. In the drawing, a field for inputting parameters is displayed at the side of an item representing "Keyword Filter" service. Parameters inputted by a user are passed to the service providing unit along with an input document when the selected service execution unit executes the service. Thereby, when a service to perform the filtering of "extracting documents containing predetermined keywords" is selected, the user can specify the keywords as input parameters of the service.

FIG. 20 shows an example that, using "usable group" contained in the service attribute information when creating service items during the service list creation processing, changes the display form of services unusable to a current user. This can be implemented by adding an option "selection impossible" to "selection type" of a service item so that, when creating service items, if a group to which the user belongs is not contained in "usable group", "selection type" is set to "selection impossible", and using a display form different from that of other service items. Moreover, by making it impossible to select services specified as "selection impossible" during service selection processing, services provided with a predetermined use right can be guarded against use by users not having the right. As another method, items representing unusable services may be kept from being added to a service list during the service list creation processing.

Third Embodiment

Next, a third embodiment of the present invention is described. The third embodiment is a service processing apparatus that represents a list of applicable services by using a set of icons representing the services, and decides a combination of services and the order of executing them by a user selecting a proper icon from the icon set and placing it.

The configuration of the third embodiment is the same as that of the first embodiment. When the service display and selection unit 304 performs the service list creation processing, icons are created as service items and are placed in an area representing a set of applicable services on a user interface.

When the service display and selection unit 304 performs the service selection processing, a service is selected by using an input apparatus such as a mouse and moving an icon representing the service from an area representing a set of applicable services to an area representing a set of selected services.

Moreover, when the service display and selection unit 304 invokes the selected service execution processing from the service selection processing, icon positions are obtained sequentially from a specific direction of the area representing a set of selected services and the execution of the services in the service set are decided according to the icon positions.

Figure 21:
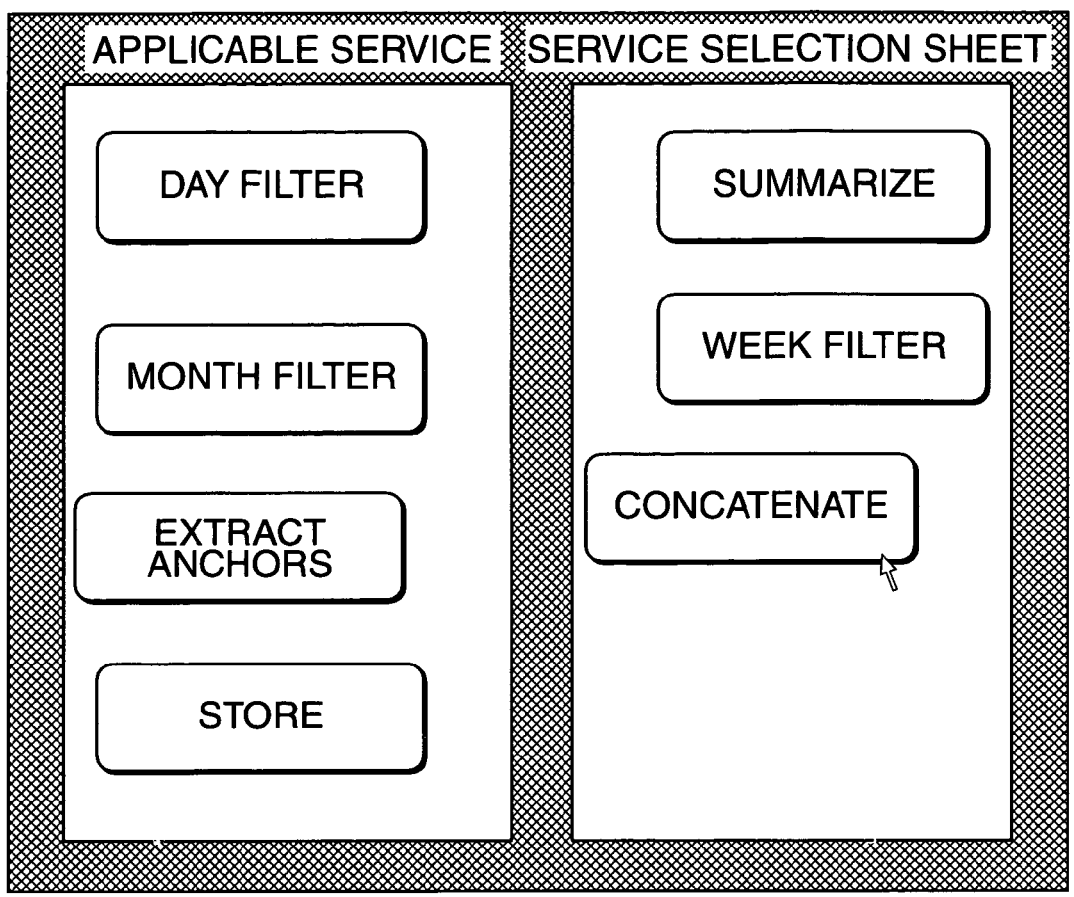
FIG. 21 shows an example of a user interface in a third embodiment of the present invention.

FIG. 21 shows an example of displaying a user interface in the third embodiment of the present invention. According to the example, users can freely decide a service execution order from combinations of services selected from a list of applicable services.

Figure 22:
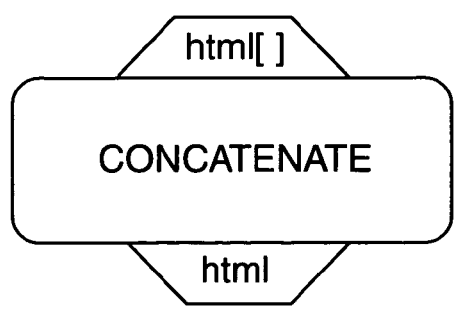
FIG. 22 shows an example of a service icon in a third embodiment.

FIG. 22 shows an example of addition of graphic elements corresponding to service attribute information to a service icon.

This can be implemented in such a way that the service display and selection unit holds graphic information corresponding to elements of the service attribute information and creates a service icon using graphic elements corresponding to pertinent attribute information.

In the present example, the types of an input document and an output document of a service are displayed on a service icon. Thereby, users can select a service while recognizing whether the type of an output document and the type of an input document match across the service when selecting and placing an icon.

In combination with the second embodiment of the present invention, graphic elements corresponding to the service attribute information representing the state of services such as the number of transactions processed by the services and server load can also be added to icons. In this example, by periodically updating the display of graphic elements representing the service attribute information, the state of services can be presented to users in a form that is visually easy to recognize.

Fourth Embodiment

Next, a fourth embodiment of the present invention is described. The fourth embodiment of the present invention is a service processing apparatus that applies a combination of user-selected services to data collected on a network.

Figure 23:
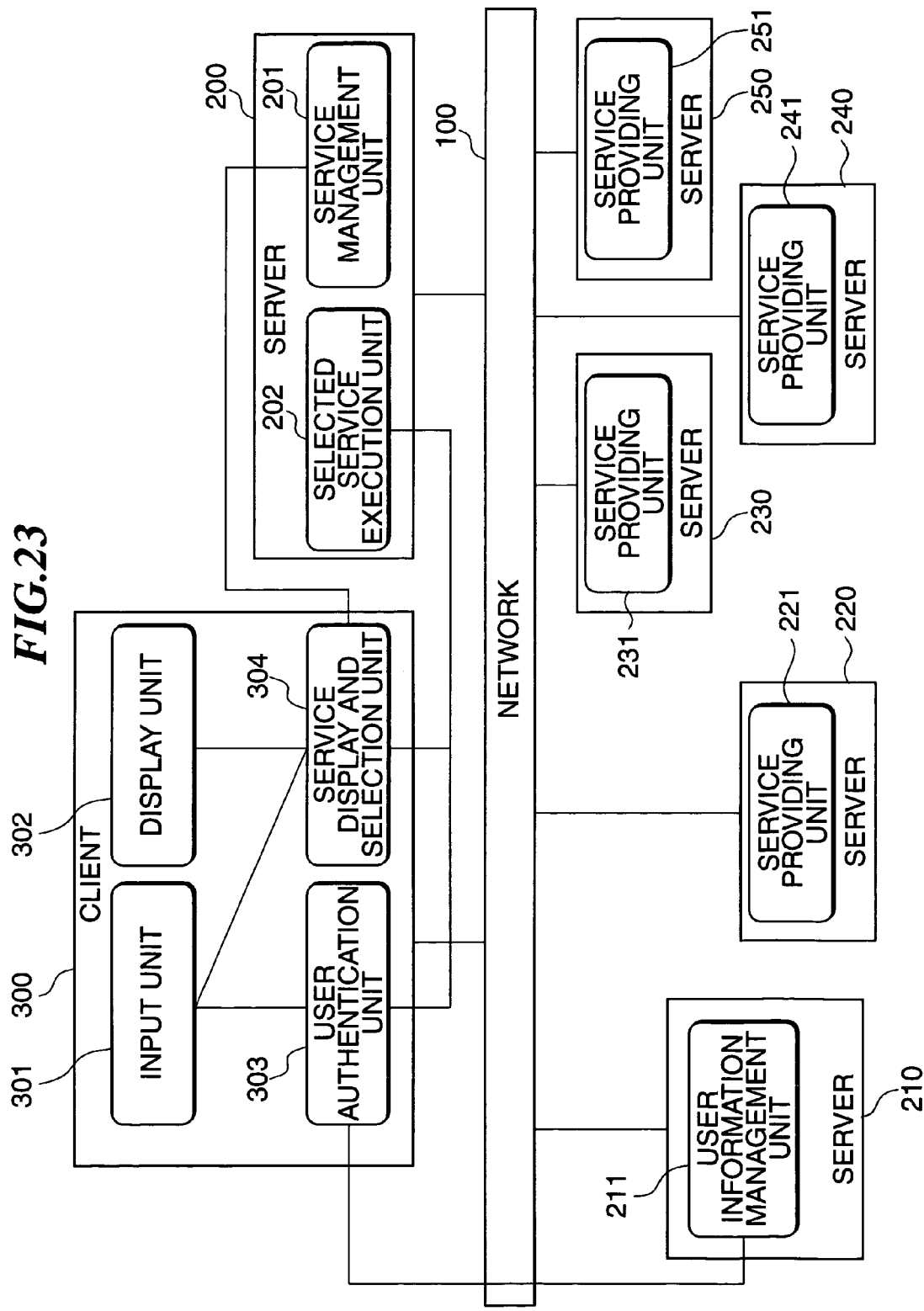
FIG. 23 is a block diagram showing the configuration of a service processing apparatus of the third embodiment of the present invention.

FIG. 23 shows the configuration of a service processing apparatus of the fourth embodiment of the present invention. The configuration of the service processing apparatus of the fourth embodiment is the same as that of the service processing apparatus of the first embodiment, except that the document set display and selection unit 305, the document information management unit 221, and the document storage unit 222 are excluded. Portions in FIG. 23 that correspond to portions in FIG. 1 are identified by the same reference numbers; a detailed description of them is omitted.

FIG. 24 shows an example of category information of services managed by the service management unit 201. As shown in the drawing, in the fourth embodiment, a category "collection" is added to category information in the first embodiment. This category denotes a service that accesses servers over a network to collect data of a given type. One example is a service that collects music data by patrolling preregistered WWW (World Wide Web) servers that release the music data on the Internet.

FIG. 25 shows an example of a service management table managed by the service management unit 201. A value "null" in "input data information" in the drawing denotes that nothing is inputted, and a value "data[ ]" in "output data information" denotes that an array of binary data is used as the type of output data. Therefore, "Movie Collector" service in the drawing denotes that nothing is received as input data and a set of collected data is returned as output data.

Figure 14:
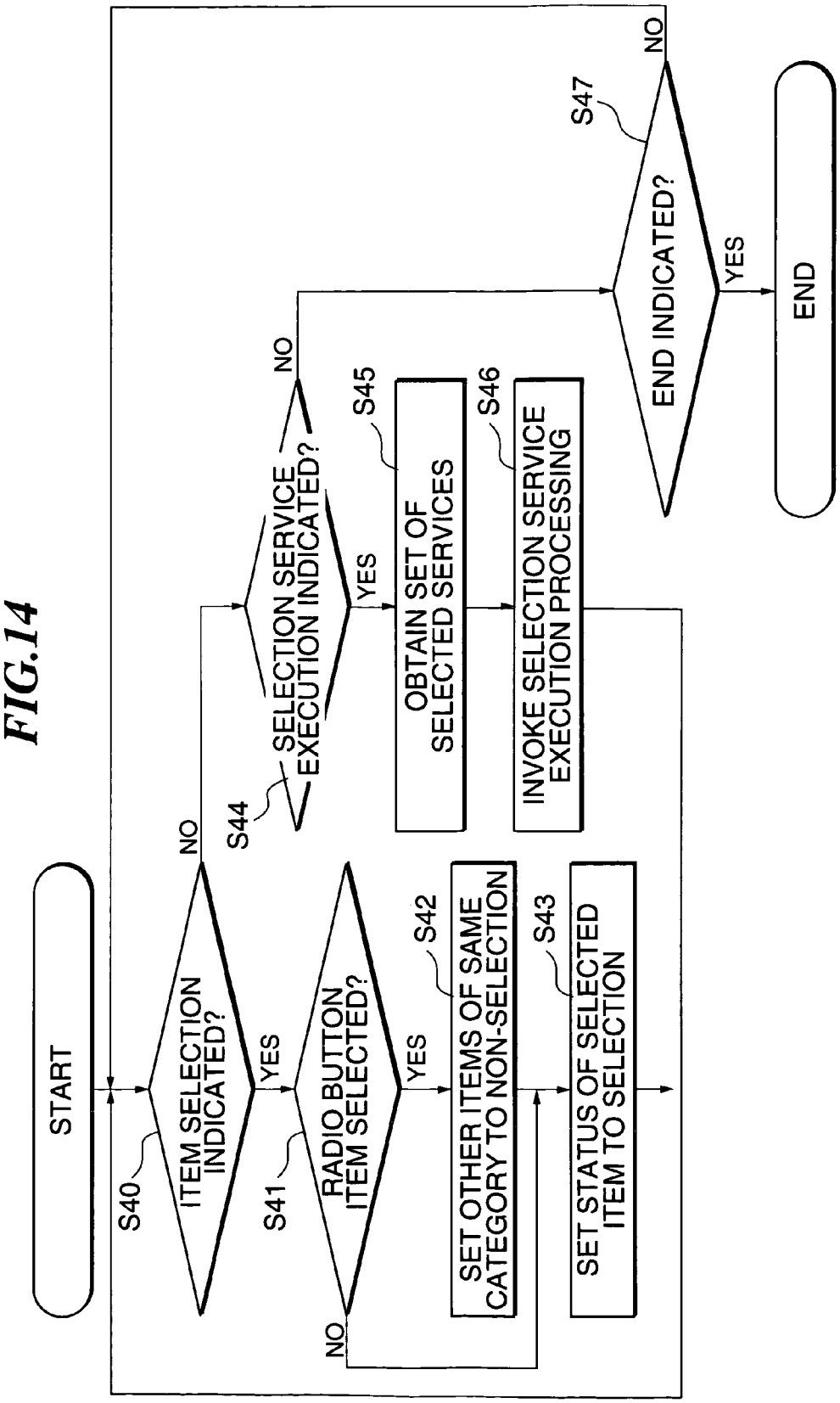
FIG. 14 is a flowchart for explaining the service selection operation of the service display and selection unit of the first embodiment.

In the service selection processing in the service display and selection unit 304, before invoking the selected service execution processing in step S46 of FIG. 14, it is judged whether the "collection" category service is put in the start of a set of services, and if not so, an error is displayed, and the service selection processing continues.

Deleted from the selected service execution processing in the selected service execution unit 202 are the processing to receive an input document in step S50 of FIG. 15 and the processing to judge whether input data information of the first service and an input document match in type, in step S52.

In this way, by always putting a service to collect data in the start of a set of services selected by users, multimedia data such as sound and image can be collected to apply various services such as filtering, extraction, and editing to the multimedia data.

As has been described above, according to the present invention, since the service display and selection section presents users with a list of applicable services updated as required to enable the users to specify selective combinations of the services, the users can easily recognize currently active, applicable services, and select and combine the services flexibly to meet their purposes.

An effect as described below is obtained in a concrete configuration.

That is, since the document set display and selection section presents users with a list of documents included in a document set to enable the users to specify selective combinations of document sets or documents to be subjected to services, the services can apply smoothly to the documents.

Moreover, the service display and selection section displays a list of services along with information associated with service items, such as a summary of a service processing content, the total number of transactions having been heretofore processed by the services, the number of transactions currently being processed, the load status of servers to execute the services, an elapsed time from activation of the services, and information about whether users can apply the services, and thereby makes it possible for the users to easily select proper services from the list of services.

Likewise, the service display and selection section, when displaying a list of services, places service items grouped for each category or based on the priority of services, and thereby makes it possible for the users to easily select proper services from the list of services.

As a method for displaying a list of services, the service display and selection section presents a set of icons representing applicable services and combines the services by users selecting desired icons from the icon set and placing them, and the selected service execution section decides a service execution order according to the positions where the icons representing the services are placed, whereby combinations and an execution order of the services can be easily controlled.

What is claimed is:

1. A service processing apparatus, comprising:
   a plurality of service providing units that provides a corresponding service to perform predetermined information processing;
   a service display and selection unit that presents a user with an itemized list of applicable services and receiving specification of a selected service for a service attribute category from the user, the service display and selection unit fetching service attribute information for the selected service and combining services that match the service attribute category as a combined service item, and adding to the itemized list;
   a selected service execution unit that applies the user-selected service to specified data or a set thereof;
   a document management unit that manages a document and a document set; and
   a document set display and selection unit that presents the user with a list of predetermined document sets managed by the document management unit or documents included in the document sets and receiving specification of selected document sets or documents from the user, to enable the user to specify a selective combination of document sets or documents to be subjected to the service,
   wherein the service display and selection unit updates the itemized list of applicable services at a user-specified point and enables the user to specify a selective combination of the services, and the selected service execution unit directs the service providing units to provide the service based on the specified combination of services.

2. The service processing apparatus according to claim 1, further comprising:
   a service management unit that manages information about a set of services in operation and the service provided by each service providing unit in a service management table, wherein the service display and selection unit presents the user with the list of the applicable services obtained by querying the service management unit and updates the list of the applicable services in response to receiving event information from the service management unit indicating that the service management table is updated.

3. The service processing apparatus according to claim 2, wherein each of the service providing units operates on corresponding one of a plurality of servers and the service management unit holds, as service information, information about the one server that executes the corresponding service.

4. The service processing apparatus according to claim 1, wherein information about the service provided by the service providing units includes a summary of the processing contents of the service, and the service display and selection unit displays the summary of the service processing contents in association with an item representing the service when displaying the list of applicable services.

5. The service processing apparatus according to claim 1, wherein information about the service provided by the service providing units includes information about the total number of transactions having been heretofore processed by the service and the number of transactions currently being processed, and the service display and selection unit, when displaying the list of applicable services, displays the information about the total number of transactions having been processed and the number of transactions currently being processed, in association with an item representing the service, and/or changes a display form of the item according to the total number of transactions having been processed and the number of transactions currently being processed.

6. The service processing apparatus according to claim 1, wherein information about the service provided by the service providing units includes information about a load status of a server to execute the service, and the service display and selection unit, when displaying the list of applicable services, displays the server load status in association with an item representing the service, and/or changes a display form of the item according to the server load status.

7. The service processing apparatus according to claim 1, wherein information about the service provided by the service providing units includes information about data inputted as a processing object of the service and data outputted as a processing result, and the service display and selection unit, when displaying the list of applicable services, places an item representing the service according to the input data information and the output data information and/or displays the input data information and the output data information in association with the item.

8. The service processing apparatus according to claim 1, wherein information about the service provided by the service providing units includes information about an input parameter of the service, and the service display and selection unit, when displaying the list of applicable services, if the service requires the input parameter, places a field for inputting the parameter in association with an item representing the service.

9. The service processing apparatus according to claim 1, wherein information about the service provided by the service providing units includes information about a service priority, and the service display and selection unit, when displaying the list of applicable services, displays the priority information in association with an item representing the service, changes a display form of the item according to the priority, and places the item based on the priority.

10. The service processing apparatus according to claim 1, further comprising:
    a user management unit that manages information about a user and a user group, wherein information about the service provided by the service providing units includes information about a user or user group which can use the service, whereby the service display and selection unit, when displaying the list of applicable services, displays an item representing the service usable only for a specified user or a group to which the user belongs, and/or discriminately displays the item representing the usable service and an item representing the service which is not usable.

11. The service processing apparatus according to claim 1, wherein, for displaying the list of services, the service display and selection unit presents a set of icons representing the respective applicable services, and the user selects and places a desired icon from the icon set, whereby the selected service execution unit decides a service execution order according to the position in which the icon representing the service is placed.

12. The service processing apparatus according to claim 11, wherein, when displaying the list of services, the service display and selection unit changes a display form of the icon representing the service according to information about the service provided by the service providing units, and displays a graphic element decided based on the information about the services in association with the icon representing the corresponding service.

13. A service processing apparatus, comprising:
- a plurality of service providing units that provides a corresponding service to perform predetermined information processing;
- a service display and selection unit that presents a user with an itemized list of applicable services and receiving specification of a selected service for a service attribute category from the user, the service display and selection unit fetching service attribute information for the selected service and combining services that match the service attribute category as a combined service item, and adding to the itemized list;
- a selected service execution unit that applies the user-selected service to specified data or a set thereof,
- wherein the service display and selection unit updates the itemized list of applicable services at a user-specified point and enables the user to specify a selective combination of the services, the selected service execution unit directs the service providing units to provide the service based on the specified combination of services, information about the service provided by the service providing units includes a service activation time or an elapsed time from the activation of the service, and the service display and selection unit, when displaying the list of applicable services, displays the activation time or elapsed time in association with an item representing the service, and/or changes a display form of the item according to the activation time or elapsed time.

14. A service processing apparatus, comprising:
- a plurality of service providing units that provides a corresponding service to perform predetermined information processing;
- a service display and selection unit that presents a user with an itemized list of applicable services and receiving specification of a selected service for a service attribute category from the user, the service display and selection unit fetching service attribute information for the selected service and combining services that match the service attribute category as a combined service item, and adding to the itemized list;
- a selected service execution unit that applies the user-selected service to specified data or a set thereof,
- wherein, the service display and selection unit updates the itemized list of applicable services at a user-specified point and enables the user to specify a selective combination of the services, the selected service execution unit directs the service providing units to provide the service based on the specified combination of services, by setting predetermined categories into which services are classified according to the content of the services, information about the service provided by the service providing units includes information about the category of the service, and the service display and selection unit, when displaying the list of applicable services, displays the information about the category in association with an item representing the service, changes a display form of the item according to the category, and/or places the item grouped into each category.

15. The service processing apparatus according to claim 14, wherein the information about the category of the service includes information indicating whether plural services belonging to the category can be selected at the same time, and the service display and selection unit, when receiving specification of the selected service from the user, allows the user to select only one service belonging to the category that does not allow simultaneous selection of the plurality of services.

16. A service processing apparatus, comprising:
- a plurality of service providing units that provides a corresponding service to perform predetermined information processing;
- a service display and selection unit that presents a user with an itemized list of applicable services and receiving specification of a selected service for a service attribute category from the user, the service display and selection unit fetching service attribute information for the selected service and combining services that match the service attribute category as a combined service item, and adding to the itemized list;
- a selected service execution unit that applies the user-selected service to specified data or a set thereof,
- wherein, the service display and selection unit updates the itemized list of applicable services at a user-specified point and enables the user to specify a selective combination of the services, the selected service execution unit directs the service providing units to provide the service based on the specified combination of services, information about the service provided by the service providing units includes information about data inputted as a processing object of the service and data outputted as a processing result, the service display and selection unit, when displaying the list of applicable services, places an item representing the service according to the input data information and the output data information and/or displays the input data information and the output data information in association with the item, and when the service display and selection unit receives specification of the selected services from the user, or when the selected service execution unit receives a combination of the services selected in the service display and selection unit, in such a combination that an output result of a specified service is used as a processing object of another service, it is judged whether the output data information of the former service matches the input data information of the latter, and the services are executed only if they match.

17. A service execution control method for controlling the execution of services in a network environment in which servers and clients are networked and the servers provide the services, the method comprising:
- updating and displaying a list of usable services for a service category at a user-specified point;
- fetching service attribute information for the selected service and combining services that match the category as a combined service item;
- selecting and combining the displayed services, including comparing whether the displayed services match the service category, and if so creating a combined service item for the list of usable services;
- directing a corresponding server to execute services based on the combination of the services;
- managing a document and a document set;
- presenting the user with a list of predetermined document sets or documents included in the document sets; and
- receiving specification of selected document sets or documents from the user, to enable the user to specify a selective combination of document sets or documents to be subjected to the service.

18. A computer-readable recording medium storing a program to be executed on a computer in a network environment in which servers and clients are networked and the servers provide the services, the program comprising:

updating and displaying a list of usable services for a service category at a user-specified point;

fetching service attribute information for the selected service and combining services that match the category as a combined service item;

selecting and combining the displayed services, including comparing whether the displayed services match the service category, and if so creating a combined service item for the list of usable services;

directing a corresponding server to execute services based on the combination of the services;

managing a document and a document set;

presenting the user with a list of predetermined document sets or documents included in the document sets; and receiving specification of selected document sets or documents from the user, to enable the user to specify a selective combination of document sets or documents to be subjected to the service.

19. A service processing apparatus, comprising:

a plurality of service providing units that provides a corresponding service to perform predetermined information processing;

a service display and selection unit that presents a user with an itemized list of applicable services and receiving specification of a selected service from the user, the service display and selection unit combining services that match a category as a combined service item, and adding to the itemized list;

a selected service execution unit that applies the user-selected service to specified data or a set thereof;

a document management unit that manages a document and a document set; and a document set display and selection unit that presents the user with a list of predetermined document sets managed by the document management unit or documents included in the document sets and receiving specification of selected document sets or documents from the user, to enable the user to specify a selective combination of document sets or documents to be subjected to the service, wherein the service display and selection unit updates the itemized list of applicable services at a user-specified point and enables the user to specify a selective combination of the services, and the selected service execution unit directs the service providing units to provide the service based on the specified combination of services, information about the service provided by the service providing units includes information about a load status of a server to execute the services, a total number of transactions having been heretofore processed by the service and a number of transactions currently being processed, and the service display and selection unit, when displaying the list of applicable services, displays the information about the server load status, the total number of transactions having been processed and the number of transactions currently being processed, in association with an item representing the service, and/or changes a display form of the item according to the server load status, the total number of transactions having been processed and the number of transactions currently being processed.

20. A service processing apparatus, comprising:

a plurality of service providing units that provide a corresponding service to perform predetermined information processing;

a service display and selection unit that presents a user with an itemized list of applicable services and receiving specification of a selected service from the user, the service display and selection unit combining services that match a category as a combined service item, and adding to the itemized list;

a selected service execution unit that applies the user-selected service to specified data or a set thereof;

a document management unit that manages a document and a document set; and a document set display and selection unit that presents the user with a list of predetermined document sets managed by the document management unit or documents included in the document sets and receiving specification of selected document sets or documents from the user, to enable the user to specify a selective combination of document sets or documents to be subjected to the service, wherein the service display and selection unit updates the itemized list of applicable services at a user-specified point and enables the user to specify a selective combination of the services, and the selected service execution unit directs the service providing units to provide the service based on the specified combination of services, information about the service provided by the service providing units includes information about a load status of a server to execute the service, and the service display and selection unit, when displaying the list of applicable services, displays the server load status in association with an item representing the service, and/or changes a display form of the item according to the server load status.

21. A service processing apparatus, comprising:

a plurality of service providing units that provides a corresponding service to perform predetermined information processing;

a service display and selection unit that presents a user with an itemized list of applicable services and receiving specification of a selected service from the user, the service display and selection unit combining services that match a category as a combined service item, and adding to the itemized list;

a selected service execution unit that applies the user-selected service to specified data or a set thereof;

a document management unit that manages a document and a document set;

a document set display and selection unit that presents the user with a list of predetermined document sets managed by the document management unit or documents included in the document sets and receiving specification of selected document sets or documents from the user, to enable the user to specify a selective combination of document sets or documents to be subjected to the service, and a user management unit that manages information about a user and a user group, wherein information about the service provided by the service providing units includes information about a user or user group which can use the service, whereby the service display and selection unit, when displaying the list of applicable services, displays an item representing the service usable only for a specified user or a group to which the user belongs, and/or discriminately displays the item representing the usable service and an item representing the service which is not usable, wherein the service display and selection unit updates the itemized list of applicable services at a user-specified point and enables the user to specify a selective combination of the services, and the selected service execution unit directs the service providing units to provide the service based on the specified combination of services, information about the service provided by the service providing units includes information about a service priority, and the service display and selection unit, when displaying the list of applicable services, displays the priority information in association with an item representing the service, changes a display form of the item according to the priority, and places the item based on the priority.

* * * * *